United States Patent
Baumann et al.

(10) Patent No.: US 9,010,729 B2
(45) Date of Patent: Apr. 21, 2015

(54) MEMBRANE VALVE

(75) Inventors: Johannes Baumann, Kuenzelsau (DE); Christina Ripsam, Ingelfingen-Eberstal (DE); Ralf Scheibe, Kuenzelsau (DE); Holger Schwab, Adelsheim-Sennfeld (DE)

(73) Assignee: Buerkert Werke GmbH, Ingelfingen (DE)

( * ) Notice: Subject to any disclaimer, the term of this patent is extended or adjusted under 35 U.S.C. 154(b) by 135 days.

(21) Appl. No.: 13/433,595

(22) Filed: Mar. 29, 2012

(65) Prior Publication Data

US 2012/0248364 A1 Oct. 4, 2012

(30) Foreign Application Priority Data

Mar. 31, 2011 (DE) ...................... 20 2011 004 671 U

(51) Int. Cl.
*F16K 7/14* (2006.01)
*F16K 41/10* (2006.01)

(52) U.S. Cl.
CPC ................. *F16K 41/103* (2013.01); *F16K 7/14* (2013.01)

(58) Field of Classification Search
CPC ........... F16K 7/14; F16K 7/123; F16K 7/126; F16K 27/0236; F16K 7/12; F16K 7/16; F16K 7/17; F16K 41/03
USPC ......... 251/331, 129.17, 335.2, 61.1, 61–61.5; 92/98 R
See application file for complete search history.

(56) References Cited

U.S. PATENT DOCUMENTS

| | | | | | |
|---|---|---|---|---|---|
| 2,659,565 | A | * | 11/1953 | Johnson et al. | 251/331 |
| 2,885,180 | A | * | 5/1959 | Zinkil | 251/331 |
| 2,988,322 | A | * | 6/1961 | John | 251/331 |
| 3,279,749 | A | * | 10/1966 | Fleckenstein et al. | 251/331 |
| 3,406,862 | A | * | 10/1968 | Donaldson | 220/203.17 |
| 4,029,296 | A | * | 6/1977 | Hartmann et al. | 251/331 |
| 4,175,590 | A | * | 11/1979 | Grandclement | 137/883 |
| 5,031,875 | A | * | 7/1991 | Zimmerman | 251/61.1 |
| 5,291,822 | A | * | 3/1994 | Alsobrooks et al. | 92/93 |
| 5,386,849 | A | * | 2/1995 | Gilchrist et al. | 137/605 |
| 5,680,807 | A | * | 10/1997 | Wagner et al. | 92/48 |
| 5,967,182 | A | * | 10/1999 | Wilson | 137/544 |

(Continued)

FOREIGN PATENT DOCUMENTS

DE 813 101 9/1951
DE 2 325 814 12/1974

(Continued)

OTHER PUBLICATIONS

Raw Machine Translation of DE 813161 "Sansens" (Pub. Sep. 10, 1951) provided by the EPO on Nov. 25, 2013.*

(Continued)

*Primary Examiner* — John K Fristoe, Jr.
*Assistant Examiner* — David Colon Morales
(74) *Attorney, Agent, or Firm* — Cowan, Liebowitz & Latman, P.C.; Steven D. Underwood

(57) ABSTRACT

A membrane valve comprising a first and a second valve housing part and a membrane clamped between the valve housing parts comprises a peripherally surrounding bead on the membrane and a thin, axially movable membrane portion adjacent thereto. The bead is supported by the two valve housing parts and is provided with an undercut at a radial inner side. Further, a membrane for installation in a membrane valve is provided.

15 Claims, 2 Drawing Sheets

(56) References Cited

U.S. PATENT DOCUMENTS

| | | | |
|---|---|---|---|
| 5,992,297 A * | 11/1999 | Plantan et al. | 92/98 R |
| 6,216,731 B1 * | 4/2001 | Frenkel | 137/556 |
| 6,394,417 B1 * | 5/2002 | Browne et al. | 251/331 |
| 6,719,268 B2 * | 4/2004 | Fukano et al. | 251/129.17 |
| 7,628,376 B2 * | 12/2009 | Masamura et al. | 251/63.6 |
| 2006/0108552 A1 * | 5/2006 | Herbert et al. | 251/129.17 |
| 2009/0020723 A1 * | 1/2009 | Masamura et al. | 251/331 |
| 2010/0071776 A1 | 3/2010 | Ringer et al. | |

FOREIGN PATENT DOCUMENTS

| | | |
|---|---|---|
| DE | 198 49 742 | 5/1999 |
| DE | 102 24 804 | 1/2004 |
| GB | 1 476 334 | 6/1977 |

OTHER PUBLICATIONS

Search Report of Mar. 31, 2011, for corresponding German Patent Application No. 20 2011 004 671.0.

* cited by examiner

MEMBRANE VALVE

TECHNICAL FIELD

The invention relates to a membrane valve as well as to a membrane for being installed in such a membrane valve.

BACKGROUND OF THE INVENTION

Membrane valves are known. They are frequently used in the field of analysis if a separation of the media is desired. This means that a fluid housing which is in contact with a medium is fluidically separated from an actuation unit by means of a membrane so that the medium is not able to find its way to the actuation unit. On a side facing away from the fluid housing, the membrane is connected to an actuation element which in turn cooperates with the actuation unit.

It is also known to clamp the membrane between two housing parts. To this end, a contour such as e.g. a groove for receiving a membrane fastening portion is usually provided in each of the housing parts.

In the process of manufacturing these membrane valves, the production of each of the contours entails an expenditure in terms of time and costs.

Moreover, membrane valves can normally be used for a pressure range only up to approximately 10 bar. In case of higher pressures, these valves are prone to leakage.

Therefore, it is the object of the invention to provide a membrane valve and a membrane for a membrane valve which still work reliably even with pressures of more than 10 bar.

BRIEF SUMMARY OF THE INVENTION

The present invention provides a membrane valve having a first and a second valve housing part and a membrane clamped between the valve housing parts, the membrane comprising a peripherally surrounding bead and a thin, axially movable and preferably plate-shaped membrane portion, the bead being supported by the two valve housing parts. In this arrangement, the bead is provided with an undercut at a radial inner side. Through this measure, an axial contact surface of the bead on one of the two valve housing parts is advantageously enlarged, enhancing the sealing effect. Further, an axial sealing force is created by the undercut due to the fluid pressure so that a self-enhancement of the sealing effect is achieved. The plate-shaped membrane portion is thin, i.e. thinner than the bead.

In one embodiment, the bead has an axial end face and comprises a radially inner sealing lip at the transition of the end face to the undercut side face. The sealing lip is supported by one of the two valve housing parts. The radially inner sealing lip on the end face at the transition to the undercut side face has the effect that in case of applying pressure to the membrane at least one pressure force component acts on the sealing lip and presses it in axial direction against the adjacent valve housing part, thus counteracting leakiness. This even enhances the sealing effect with pressure application. Membrane valves according to the invention may be reliably operated without any tightness problems at a pressure of at least up to 30 bar.

Advantageously, the radially inner sealing lip is the radially innermost portion of the bead. This is why almost the entire force acting in axial direction or generated by the fluid pressure in the undercut acts on the inner sealing lip.

The axial end face of the bead is preferably realized so as to be planar.

The preferred embodiment further makes provision that the end face rests on a planar portion of one of the housing parts.

In one embodiment, the undercut side face, as seen in a radial section, extends radially outwards in an acute angle relative to the axial direction and further towards a transition of the bead to the adjoining membrane portion. Thus, the undercut side face has the shape of a truncated cone.

It is preferred that the axial end face of the bead is situated in a parting plane of the valve housing parts where the housing parts contact each other.

The end face of the bead comprises a surrounding axial, exposed notch so that a radial inner sealing lip and a radial outer sealing lip are defined. The radial inner and outer sealing lips are both supported by the same valve housing part and are radially pressed apart in opposite directions during the process of clamping between the valve housing parts. This has the advantage that a membrane, which when not installed comprises a bead with a radial side face parallel to the axial direction, is pressed in the installed state such that only then the advantageous radially undercut side face would develop. Membranes comprising a bead without an undercut side face may be produced in a much easier manner.

The inner lip preferably has a sharp edge. This sharp edge prevents that a so-called "dead space" is created at the inner sealing lip between the membrane and the housing part; such a dead space would be prone to the agglomeration of residues of the medium which could undesirably remain at this place during a rinsing operation. This has to be excluded, above all, for applications in the field of analysis or in medical engineering.

In one embodiment, a recess for receiving the bead comprising the membrane is provided on the first valve housing part. The recess offers a defined space to the bead, while a desired compression may be adjusted by means of the space geometry. The other valve housing part may be realized without any recess for the bead, if applicable.

It has turned out to be favorable if the membrane portion adjoining the bead divides the bead in two halves and the recess receives the half of the bead which is formed without an undercut side face. The recess is advantageously arranged in the valve housing part which is adjacent to a valve actuation unit. With this, the undercut side face faces fluidic ports, is exposed to the prevailing medium pressure and brings about the reliable tightness even with higher pressures, as described above.

In one embodiment, the recess has its radially inner side provided with a surrounding, i.e. circumferential or ring-shaped protrusion extending axially towards the parting plane. The protrusion has an advantageous effect on the stability of the connection between the two housing parts and the membrane. This will prevent the bead of the membrane from moving out of the recess in an undesired way when the membrane is subject to pressure.

Conveniently, the second valve housing part has an essentially planar design at least in the region of the parting plane of the two valve housing parts. This means that the second valve housing part can be produced in a cheap and cost-efficient manner without a special sealing contour, for instance by milling. Moreover, this allows to readily assemble several valves on a shared planar plate side by side in rows, for example.

Advantageously, the membrane is only axially clamped between the valve housing parts whereby the membrane portion adjoining the bead is unaffected by the clamping region, ensuring high flexibility for the membrane.

In a preferred embodiment, the bead has an essentially triangular cross-section in the unclamped state. This geometric design of the membrane comprises an undercut side face already in the not installed state, making the production process of the membrane more difficult indeed, but optimizing the above-described effect of the reliable sealing in case of higher pressures.

It is also possible, however, to provide the bead of the membrane with vertical side faces, the undercut side face only being created by compressing the bead between the housing parts during mounting the membrane.

Moreover, the invention provides a membrane for installation in a membrane valve, the membrane comprising a peripherally surrounding bead and a thin, axially movable membrane portion adjacent thereto, the bead comprising an axial end face with a surrounding axial notch so that a radial inner and a radial outer sealing lip are defined. Due to this geometric design of the membrane, the latter is suitable to reliably seal pressures in membrane valves of more than 30 bar.

DETAILED DESCRIPTION OF PREFERRED EMBODIMENTS

Figure 1:
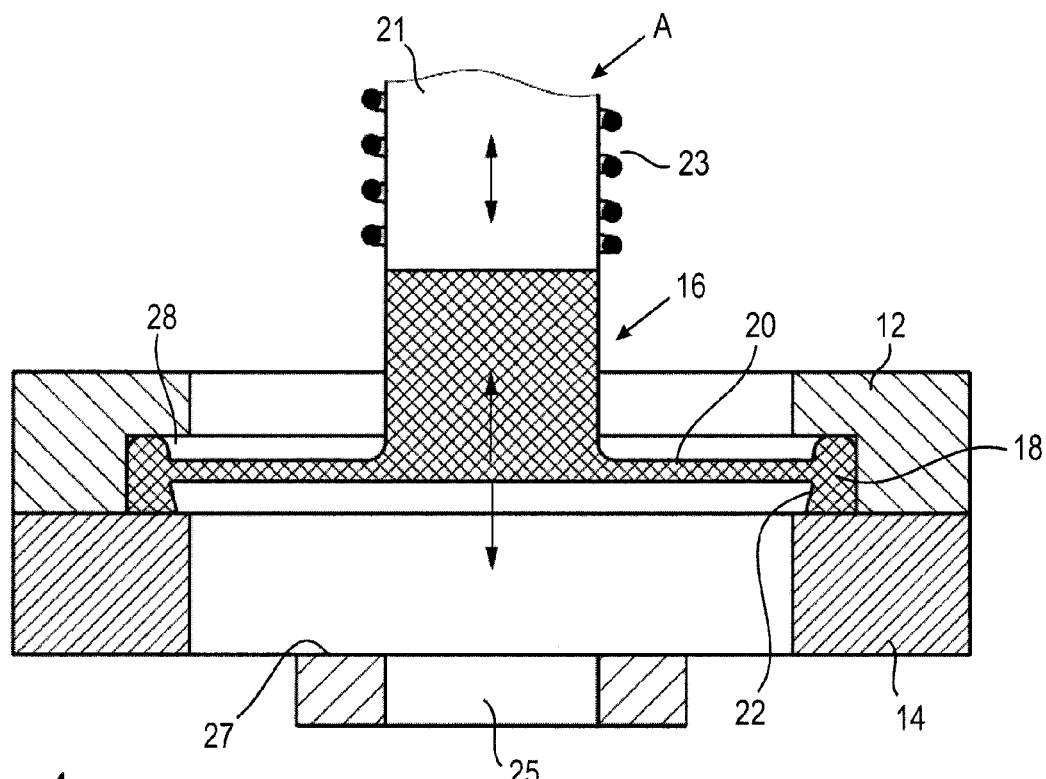
FIG. 1 is a radial sectional view through a cut-out of a membrane valve according to the invention comprising a membrane of the invention clamped therein.

FIG. 1 illustrates a sectional view through a part of a valve housing 10 of a membrane valve comprising a first valve housing part 12, an adjoining second valve housing part 14 and a membrane 16 clamped therebetween.

At its periphery, the membrane 16 comprises a surrounding bead 18 and an integrally adjoining, thin and plate-shaped membrane portion 20. The thin membrane portion 20 is flexible and can move in axial direction when acted upon with pressure.

The bead 18 is supported by the valve housing parts 12, 14.

The bead 18 axially protruding with respect to the portion 20 is provided with an undercut on a radial inner side 22.

The first valve housing part 12 is adjacent to an actuation unit A. On the side of the membrane 16 facing the actuation unit A, the membrane 16 is firmly connected to a valve actuation element (here of a magnetic armature) in known manner, the latter cooperating with the actuation unit A. The membrane 16 may be fastened to a magnetic armature 21, for instance, which is arranged in a coil 23 of the actuation unit A so as to be axially movable therein. In the area of the armature 21, the membrane 16 has a stamp-like bulge which is connected to the armature 21 and annularly surrounded by the thin membrane portion 20.

The second valve housing part 14 belongs to a fluid housing, with at least one fluid channel 25 opening into the latter. A valve seat 27 may be provided opposite the membrane at the fluid channel 25; this valve seat can be cleared or closed by the membrane 16 depending on the switching position of the valve.

A medium is present in the valve on the side of the membrane 16 adjoining the second valve housing part 14 and flows in, for example, through the channel 25.

The bead 18 (see FIG. 2) has an axial, planar end face 24 which rests against the housing part 14 and comprises a radial inner sealing lip 26 at the transition to the undercut side face 22. The axial end face 24 is preferably formed so as to be planar.

Advantageously, the inner sealing lip 26 is the radially innermost portion of the bead 18.

This sealing lip 26 is supported by the second valve housing part 14 and is pressed against this housing part in the illustrated assembly situation. In case of an existing medium pressure, the sealing lip 26 is further pressed against the second valve housing part 14, as with this geometric arrangement there will always be at least one component of the pressure force effective in the undercut part in axial direction due to the fluid pressure. In this way, it is prevented that the axial end face 24 could come loose from the second housing part 14, which would result in leakiness in an undesired manner.

Arranged in the first valve housing part 12 (see FIGS. 1 and 2) is a recess 28 for receiving the bead 18. The second valve housing part 14, however, is realized with an essentially planar design at least in the region of a contact plane or parting plane 30 of the two valve housing parts 12, 14. This has the advantage that only one sealing contour is required in a valve housing part, reducing the manufacturing costs and, above all, having a favorable effect in case of a miniaturization of membrane valves. In this way, the housing part 14 represents a part which is not afflicted with tolerances in the membrane fastening region in the valve.

The entire outer side of the bead 18 has contact with the cylindrical side face 29 of the recess 28.

A further advantage is that the valve housing part 14 may be designed as a connection plate on which several valves may be lined up in a simple manner.

Due to the geometric design of the recess 28, for instance by altering the height and/or the depth of the recess, a desired compression of the bead 18 in axial and radial directions can be adjusted.

Figure 2:
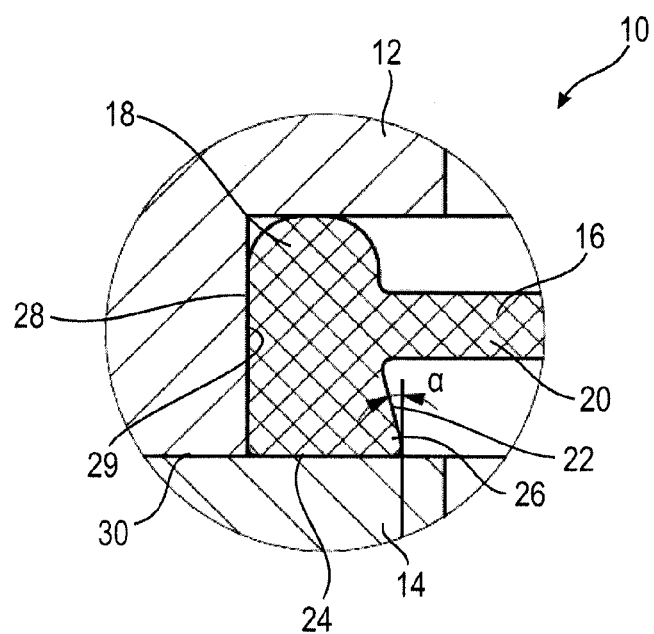
FIGS. 2 and 3 are radial sectional views through first and second embodiments of a valve housing of a membrane valve of the invention comprising a membrane according to the invention.

In the embodiment according to FIG. 2, the end face 24 as well as the surrounding, radially outer side face 29 have their entire surface areas resting against the housing parts 12, 14.

The axial end face 24 of the bead 18 lies in the parting plane 30 of the two valve housing parts 12, 14.

Figure 3:
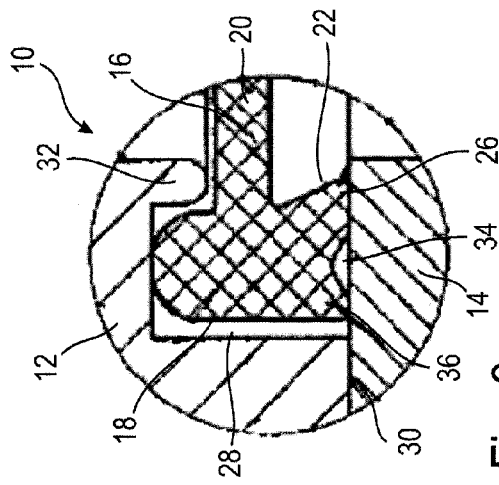

FIG. 3 shows a sectional view through a second embodiment of a valve housings 10 comprising the membrane 16.

Unlike FIG. 2, the recess 28 in FIG. 3 has its radial inner side provided with an axial, circumferential or ring-shaped protrusion 32 extending towards the parting plane 30. Due to the protrusion 32, the stability of the connection between the valve housing parts 12, 14 and the membrane 16 is enhanced. This is why a smaller axial compression force on the bead 18 is sufficient with this embodiment in order to safely retain the membrane 16 between the valve housing parts 12, 14 even when subjected to pressure.

As seen in the sectional view, the protrusion 32 has a substantially semicircular contour at its end pointing towards the membrane 16. This is why the membrane portion 20 adjoining the bead 18 fits snugly to the protrusion 32 when pressure is applied, whereby the risk of the formation of a crack in the membrane 16 is minimized.

It goes without saying that the protrusion 32 may have another geometry at its end. However, it is favorable here to avoid any sharp edges.

A further difference of the embodiment illustrated in FIG. 3 to the previous one relates to the bead 18 of the membrane 16. The bead 18 has its axial end face 24 provided with a surrounding axial notch 34 so that the radial inner sealing lip 26 and a radial outer sealing lip 36 are defined.

Depending on the compression level of the bead 18, the axial notch 34 may be pronounced to a greater or lesser extent, or there is no notch at all like in the embodiment according to FIG. 1.

Advantageously, the shape of the bead 18 is selected such and the notch 34 has a depth such that the bead 18 has an undercut at its radial inner side when an axial pressure is applied to the bead 18 during the assembly process.

Thus, the advantageous undercut side face 22 of the bead 18 in the valve housing 10 may be provided on the membrane 16 already in the non-installed state or may be formed only in the assembly process.

Various embodiments of the membrane 16 in the non-installed state will be exemplarily described in the following.

Figure 4:
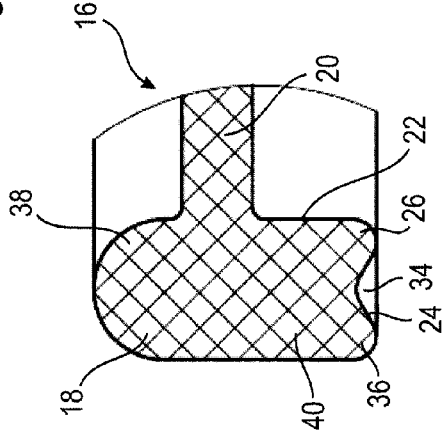

FIG. 4 illustrates a sectional view of a membrane 16 comprising a bead 18 and the thin membrane portion 20 adjacent thereto. The membrane portion 20 divides the bead 18 in two halves 38, 40. In the mounted state, the half 38 is supported by the first valve housing part 12 and the axial end face 24 of the half 40 is supported by the second valve housing part 14. The half 40 has its axial end face 24 provided with the surrounding axial, exposed notch 34 so that the radial inner and outer sealing lips 26 and 36 are defined. The radial inner side 22 of the half 40 is realized without an undercut. This will be formed not until being assembled between the two valve housing parts 12, 14. Due to the axial pressure in the installed state, the sealing lips 26, 36 are radially pressed in opposite directions so that the undercut is formed at the inner side 22.

Figure 5:
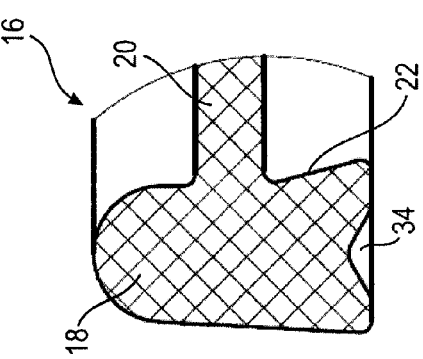

Unlike FIG. 4, FIG. 5 shows a sectional view of a membrane 16 which has its radial inner side 22 provided with an undercut already in the not installed state. The process of manufacturing parts comprising an undercut is more difficult than for parts without undercut. The advantage of the membrane 16 including an undercut is that the bead 18 has to be compressed to a lesser extent.

Figure 6:
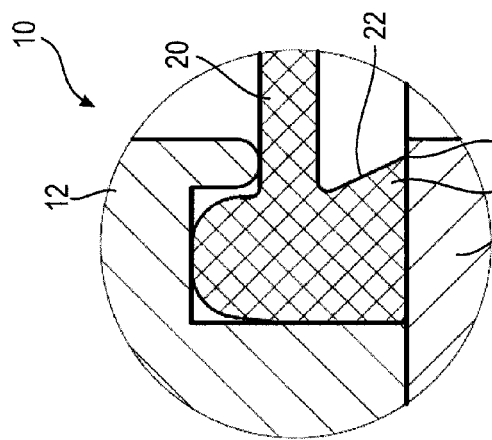
FIGS. 4 to 6 are radial sectional views of further embodiments of membranes according to the invention as parts of membrane valves according to the invention.

The embodiment of the membrane 16 according to FIG. 6 has a sharp edge 42 at the inner lip 26 of the bead 18.

Figure 7:
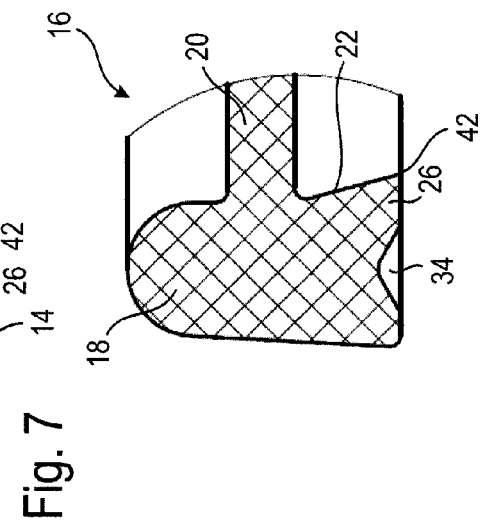
FIG. 7 is a radial sectional view through a cut-out of a valve housing of a membrane valve according to the invention corresponding to FIG. 3 comprising a membrane according to FIG. 6.

FIG. 7 shows a sectional view of the membrane 16 according to FIG. 6 in the installed state. The sharp edge 42 has the effect that the inner sealing lip 26 has full axial contact with the valve housing part 12 so that no "dead space" is formed as can be seen in FIG. 3 (embodiment without sharp edge).

The various embodiments of the membrane 16 may be randomly combined with the various embodiments of the valve housing 10. The drawings do not show all the possible combinations.

The invention claimed is:

1. A membrane valve comprising a first and a second valve housing part and having a membrane clamped between the valve housing parts, wherein the second valve housing part has an essentially planar portion at least in the region of a parting plane of the two valve housing parts, and a recess is provided on the first valve housing part, wherein the membrane comprises a peripherally surrounding bead fixed and supported between the first and the second housing parts and a thin and an axially movable membrane portion adjacent thereto dividing the bead in a protruding upper portion and a protruding lower portion, the protruding lower portion of the bead contacting the essentially planar portion of the second housing part in the region of the parting plane and being provided with an undercut side face at its radial inner side, wherein the recess on the first valve housing part receives the protruding upper portion of the bead and wherein at least one fluid channel opens into the second valve housing part.

2. The membrane valve according to claim 1, wherein the protruding upper portion of the bead comprises a single rounded end face as seen in a cross-section.

3. The membrane valve according to claim 1, wherein the membrane is only clamped between the valve housing parts in an axial direction.

4. The membrane valve according to claim 1, wherein the bead has an essentially triangular cross-section in the unclamped state.

5. The membrane valve according to claim 1, wherein the protruding lower portion comprises a sharp edge at its radial inner side.

6. The membrane valve according to claim 1, wherein the undercut side face, as seen in a radial section, extends radially outwards in an acute angle ($\alpha$) relative to the axial direction and towards a transition of the bead to the adjoining axially movable membrane portion.

7. The membrane valve according to claim 1, wherein the recess has its radially inner side provided with a circumferential protrusion extending axially towards the parting plane between the valve housing parts.

8. The membrane valve according to claim 1, wherein the protruding lower portion of the bead has an axial planar end face that rests completely on the second valve housing part.

9. The membrane valve according to claim 1, wherein the protruding lower portion of the bead comprises a surrounding axial exposed notch.

10. The membrane valve according to claim 9, wherein a radially inner and a radially outer sealing lip are formed at the sides of the axial notch.

11. The membrane valve according to claim 1, wherein the protruding lower portion has an axial end face and comprises a radially inner sealing lip at a transition of the end face to the undercut side face.

12. The membrane valve according to claim 11, wherein the radially inner sealing lip is the radially innermost portion of the bead.

13. The membrane valve according to claim 11, wherein the axial end face is planar.

14. The membrane valve according to claim 11, wherein the end face of the protruding lower portion of the bead rests on the planar portion of the second housing part.

15. The membrane valve according to claim 11, wherein the axial end face of the protruding lower portion of the bead is situated in the parting plane of the valve housing parts.

* * * * *